United States Patent [19]
Lin

[11] Patent Number: 6,007,028
[45] Date of Patent: Dec. 28, 1999

[54] DEVICE MOUNTING STRUCTURE

[76] Inventor: Steff Lin, 3F., No. 19 Lane 421, Kuang Fu South Rd., Taipei, Taiwan

[21] Appl. No.: 09/198,464

[22] Filed: Nov. 24, 1998

[51] Int. Cl.$^6$ ....................................................... G12B 9/00
[52] U.S. Cl. ............................................................ 248/27.3
[58] Field of Search .............................. 248/316.1, 309.1, 248/313, 27.1, 27.3, 343, 222.13, 224.8

[56] References Cited

U.S. PATENT DOCUMENTS

| | | | |
|---|---|---|---|
| 4,526,281 | 7/1985 | Herr | 215/211 |
| 5,909,008 | 7/1999 | Pelaez | 248/27.1 X |
| 5,931,432 | 8/1999 | Herold et al. | 248/343 |

*Primary Examiner*—Ramon O. Ramirez
*Attorney, Agent, or Firm*—Bacon & Thomas, PLLC

[57] ABSTRACT

A device mounting structure includes a stepped, annular mount, which holds a device in a hole on a peripheral side wall of an equipment housing, and a plurality locking mechanisms, which secure the stepped, annular mount to the peripheral side wall of the equipment housing, wherein each locking mechanism includes two upright lugs raised from the stepped, annular mount, an axle coupled between the upright lugs, a locking plate turned about the axle between a locking position where the stepped, annular mount is locked, and an unlocking position where the stepped, annular mount is unlocked and can be removed from the equipment housing, the locking plate having horizontal top wall and a vertical side wall raised from one end of the horizontal top wall at right angles, a torsional spring mounted around the axle to hold the locking plate at the locking position, and an adjustment screw mounted on the stepped, annular mount and stopped at the horizontal top wall of the locking plate at a bottom side and rotated inwards/backwards to move the locking plate between the locking position and the unlocking position.

3 Claims, 5 Drawing Sheets

DEVICE MOUNTING STRUCTURE

BACKGROUND OF THE INVENTION

The present invention relates to a device mounting structure, and more particularly to such a device mounting structure which comprises a stepped, annular mount for holding a device in a hole on a peripheral side wall of an equipment housing, and a plurality locking mechanisms respectively provided at one side of the annular mount for releasably securing the stepped, annular mount to the peripheral side wall of the equipment housing.

When mounting a device for example a speaker, air duct or fixture in mounting hole on a wall, screws are commonly used to fix the shell or mounting plate of the device to the wall. This device installation procedure is complicated. When installed, the installed device cannot be conveniently detached from the wall.

SUMMARY OF THE INVENTION

The present invention has been accomplished to provide a device mounting structure which can be conveniently and detachably fastened to a hole on a wall to hold a device in the hole. According to one aspect of the present invention, the device mounting structure comprises a stepped, annular mount, which holds a device in a hole on a peripheral side wall of an equipment housing, and a plurality locking mechanisms, which releasably secure the stepped, annular mount to the peripheral side wall of the equipment housing. According to another aspect of the present invention, each locking mechanism comprises two upright lugs raised from the stepped, annular mount, an axle coupled between the upright lugs, a locking plate turned about the axle between a locking position where the stepped, annular mount is locked, and an unlocking position where the stepped, annular mount is unlocked and can be removed from the equipment housing, the locking plate having horizontal top wall and a vertical side wall raised from one end of the horizontal top wall at right angles, a torsional spring mounted around the axle to hold the locking plate at the locking position, and an adjustment screw mounted on the stepped, annular mount and stopped at the horizontal top wall of the locking plate at a bottom side and rotated inwards/backwards to move the locking plate between the locking position and the unlocking position.

DETAILED DESCRIPTION OF THE PREFERRED EMBODIMENT

Figure 1:
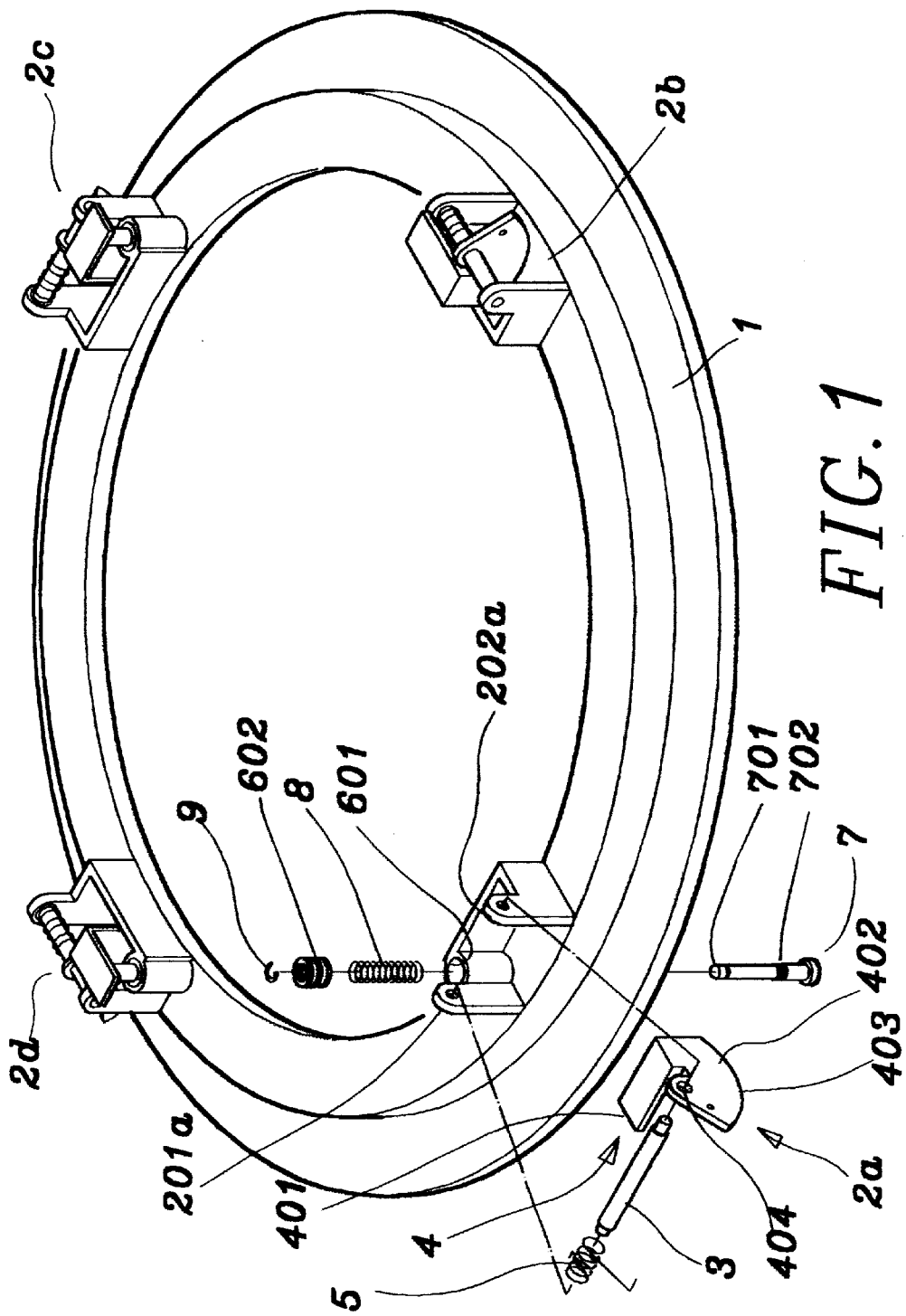
FIG. 1 is an exploded view of a device mounting structure according to the present invention.

Referring to FIG. 1, a device mounting structure in accordance with the present invention is shown comprised of stepped, annular mount 1, and a plurality of for example four locking mechanisms 2a, 2b, 2c and 2d respectively provided at one side of the annular mount 1 and equiangularly spaced around the center opening of the annular mount 1. The locking mechanisms 2a, 2b, 2c and 2d each comprise two upright lugs 201a and 202a arranged in parallel, an axle 3 coupled between the upright lugs 201a and 202a, a locking plate 4 revolvably supported on the axle 3, a torsional spring 5 mounted around the axle 3, the torsional spring 5 having one end connected to one upright lug 201a and an opposite end connected to the locking plate 4, an upright barrel 601 integral with the annular mount 1 adjacent to one upright lug 201a, a locating nut 602 fixedly fastened to the top end of the upright barrel 601 on the inside, an adjustment screw 7 inserted through the upright barrel 601 from the bottom side of the annular mount 1, the adjustment screw 7 having a threaded section 702 on the middle threaded into the locating nut 602 and a tip 701 extended from one end of the threaded stem 702 and disposed outside the upright barrel 601, a clamp 9 fastened to the periphery of the tip 701 of the threaded stem 702 which stops the adjustment screw 7 from falling out of the upright barrel 601 when the threaded stem 702 of the adjustment screw 7 is disengaged from the locating nut 602, and a compression spring 8 mounted around the adjustment screw 7 inside the upright barrel 601 and stopped between the head of the adjustment screw 7 and the locating nut 602. The locking plate 4 comprises a horizontal top wall 401, a vertical side wall 402 raised from one end of the horizontal top wall 401 at right angles, and a pivot hole 404 at the vertical side wall 402 adjacent to the horizontal top wall 401 through which the axle 3 passes. The vertical side wall 402 is shaped like a sector plate having a smoothly curved bottom edge 403.

Figure 3:
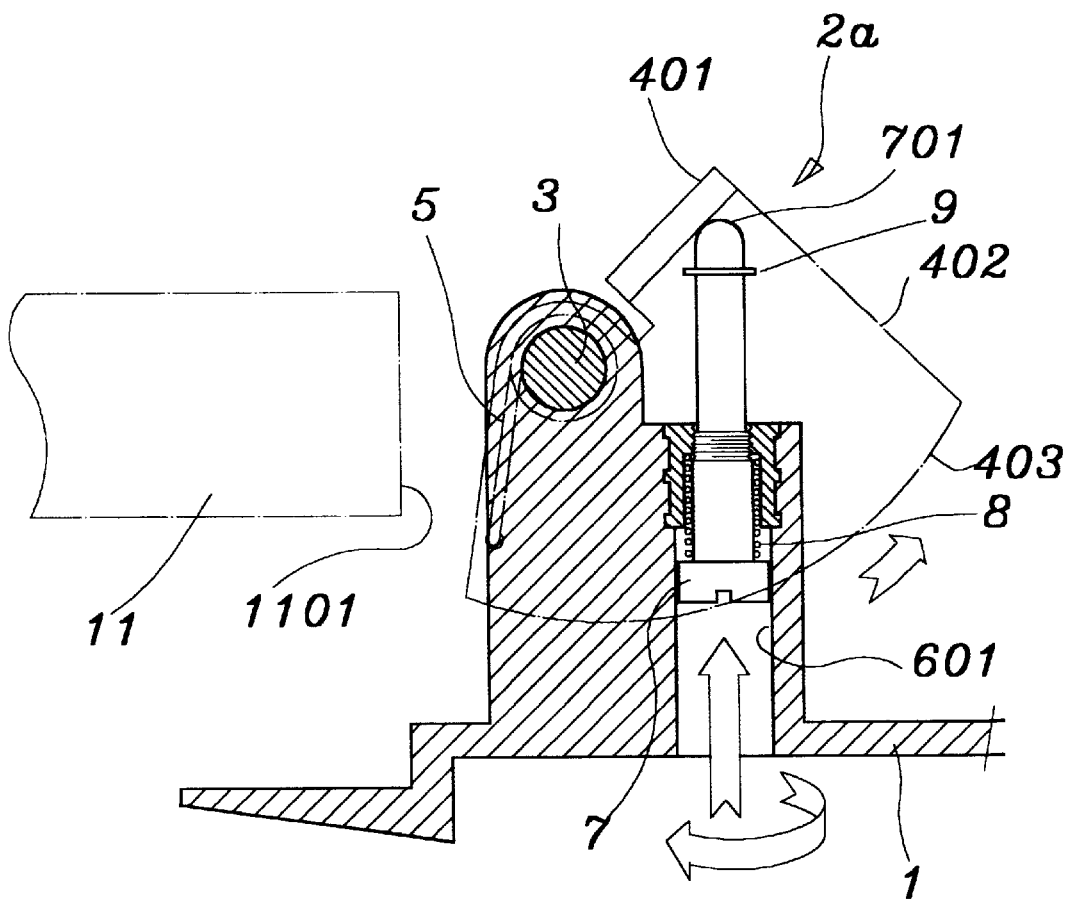
FIG. 3 is a sectional view in an enlarged scale of a part of the present invention, showing the locking plate turned to the unlocking position.
Figure 4:
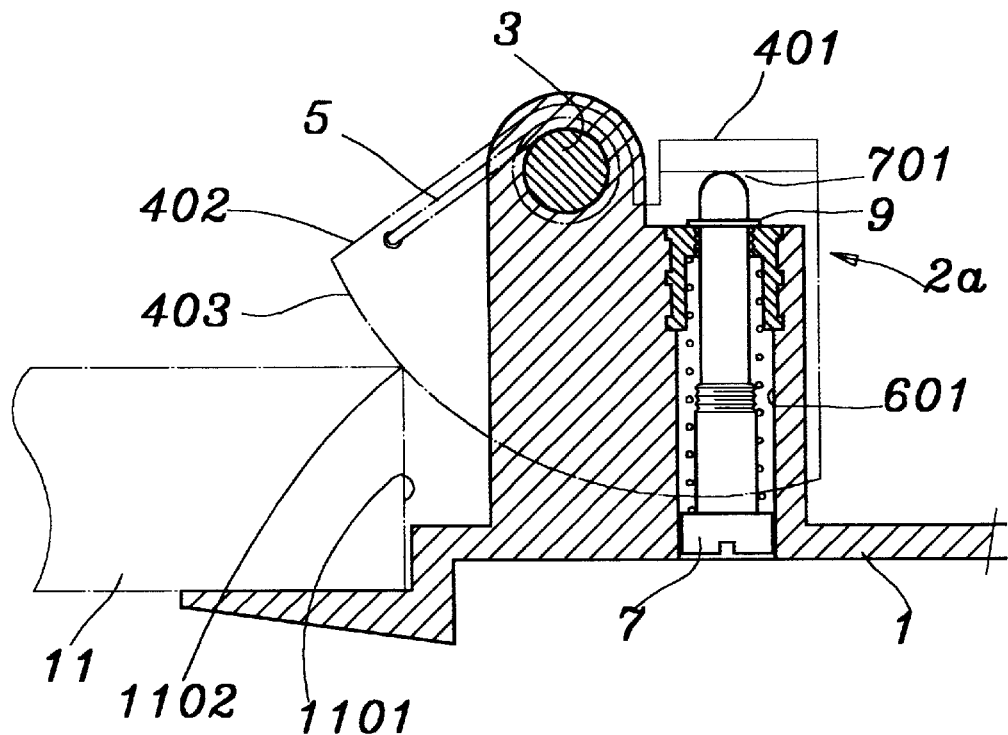
FIG. 4 is similar to FIG. 3 but showing the locking plate turned to the locking position.
Figure 5:
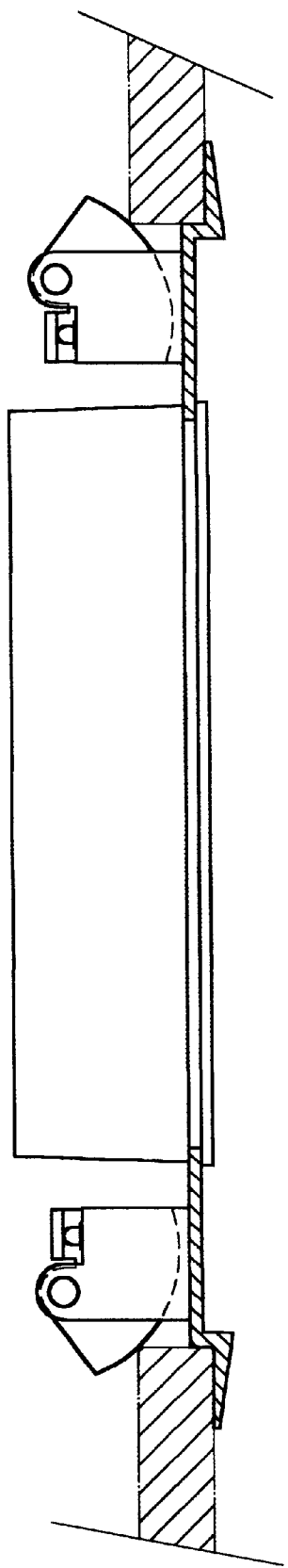
FIG. 5 is a schematic drawing showing the device mounting structure installed in a hole on an equipment housing and locked.

Referring to FIGS. 3 and 4, when the tip 701 of the adjustment screw 7 is stopped at the horizontal top wall 401 of the locking plate 4 at the bottom side. When the adjustment screw 7 is rotated inwards in the locating nut 602, the compression spring 8 is compressed, and the horizontal top wall 401 of the locking plate 4 is pushed upwards by the adjustment screw 7, causing the locking plate 4 to be turned about the axle 3 in one direction and the torsional spring 5 to be compressed (see FIG. 3). On the contrary, when the adjustment screw 7 is rotated outwards in the reversed direction, the locking plate 4 is released from the push force of the adjustment screw 7, and the torsional spring 5 is released, thereby causing the locking plate 4 to be forced by the spring force of the torsional spring 5 to rotate on the axle 3 in the reversed direction from the position shown in FIG. 3 to the position shown in FIG. 4.

Figure 2:
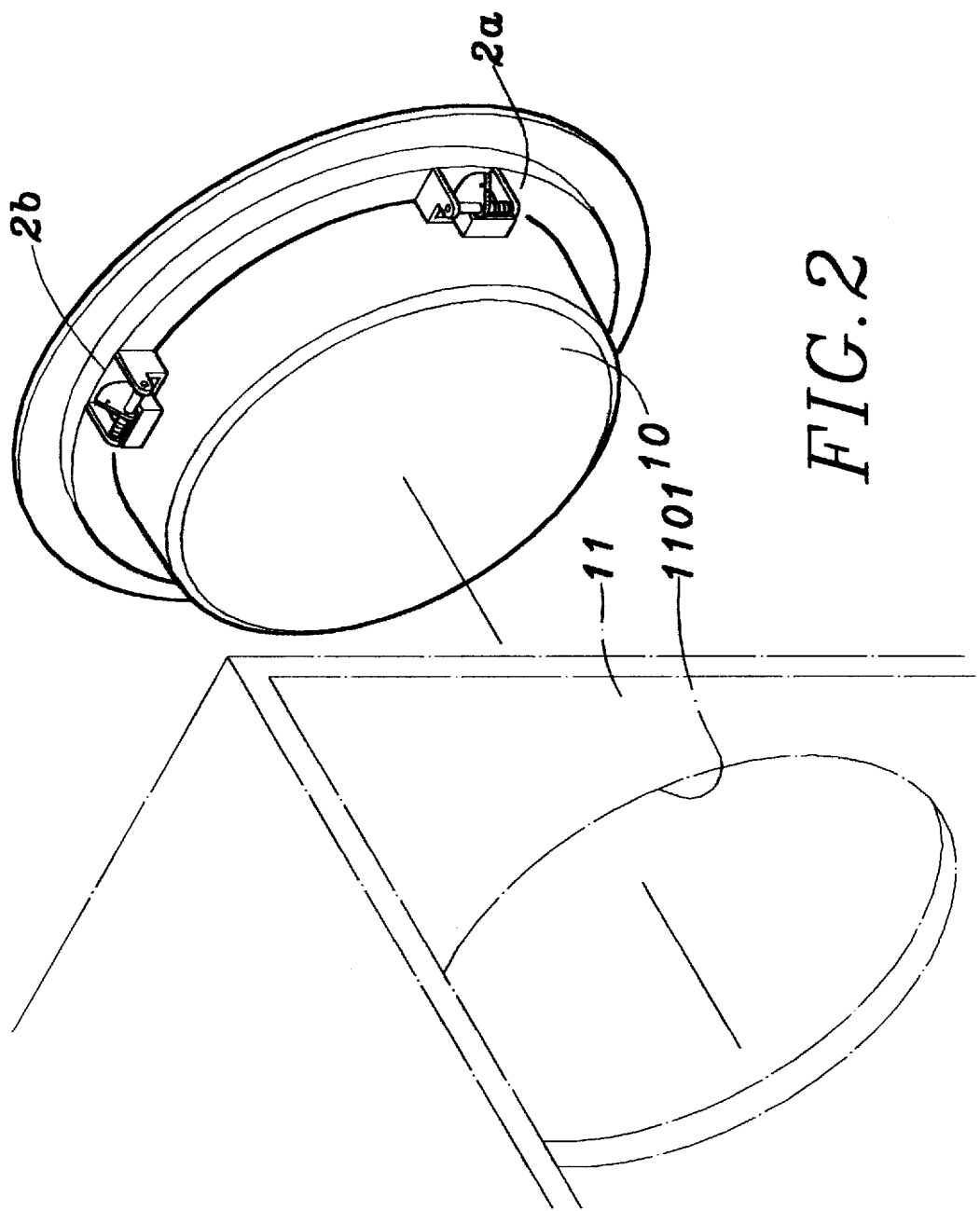
FIG. 2 is an applied view of the present invention.

Referring to FIGS. 2 and FIGS. 3 and 4 again, when a device for example a speaker 10 is fixedly mounted in the center opening of the stepped, annular mount 1, the adjustment screws 7 of the locking mechanisms 2a, 2b, 2c and 2d are respectively fastened tight to move the respective locking plates 4 from the locking position shown in FIG. 4 to the unlocking position shown in FIG. 3, then the stepped annular mount 1 is attached to a peripheral wall 11 of an equipment housing, permitting the locking mechanisms 2a, 2b, 2c and 2d and the speaker 10 to be inserted into a hole 1101 on the peripheral wall 11, and then the adjustment screws 7 of the locking mechanisms 2a, 2b, 2c and 2d are respectively loosened, permitting the respective locking plates 4 to be respectively forced by the spring force of the respective torsional springs 5 from the unlocking position shown in FIG. 3 to the locking position shown in FIG. 4. When the locking plates 4 are respectively moved to the locking position, the smoothly curved bottom edges 403 of the vertical side walls 402 of the locking plates 4 are respectively stopped against an inner peripheral edge 1102 of the hole 1101, and therefore the stepped annular mount 1 is fixed to the peripheral side wall 11 of the equipment housing. When the adjustment screws 7 of the locking mechanisms 2a, 2b, 2c and 2d are loosened again, the stepped annular mount 1 with the speaker 10 can then be disconnected from the peripheral side wall 1 1 of the equipment housing.

What the invention claimed is:

1. A device mounting structure comprising a stepped, annular mount for holding a device in a hole on a peripheral side wall of an equipment housing, and a plurality locking mechanisms respectively provided at one side of said annular mount for securing said stepped, annular mount to the peripheral side wall of the equipment housing, wherein said locking mechanisms each comprise two upright lugs raised from said stepped, annular mount and arranged in parallel, an axle coupled between said upright lugs, a locking plate turned about said axle between a locking position where said stepped, annular mount is locked, and an unlocking position where said stepped, annular mount is unlocked, said locking plate comprising a horizontal top wall and a vertical side wall raised from one end of said horizontal top wall at right angles, a torsional spring mounted around said axle to hold said locking plate at said locking position, said torsional spring having one end connected to one upright lug and an opposite end connected to said locking plate, and an adjustment screw mounted on said stepped, annular mount and stopped at the horizontal top wall of said locking plate at a bottom side and rotated inwards/backwards to move said locking plate between said locking position and said unlocking position.

2. The device mounting structure of claim 1 wherein said vertical side wall of said locking plate is shaped like a sector plate having a smoothly curved bottom edge.

3. The device mounting structure of claim 1 wherein said locking mechanisms each further comprise an upright barrel integral with said stepped, annular mount, a locating nut fixedly mounted in said upright barrel into which the adjustment screw of the respective locking mechanism is threaded, a clamp fastened to a tip end of the adjustment screw of the respective locking mechanism to secure the adjustment screw of the respective locking mechanism in place, and a compression spring mounted around the adjustment screw of the respective locking mechanism in said upright barrel and stopped between said locating nut and a head of the respective adjustment screw.

\* \* \* \* \*